(12) United States Patent
Iwasaki et al.

(10) Patent No.: US 7,700,698 B2
(45) Date of Patent: Apr. 20, 2010

(54) PROCESS FOR PRODUCING RING-OPENING METATHESIS POLYMER

(75) Inventors: Hideharu Iwasaki, Kurashiki (JP); Yasutaka Inubushi, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/815,803

(22) PCT Filed: Feb. 7, 2006

(86) PCT No.: PCT/JP2006/302427

§ 371 (c)(1), (2), (4) Date: Mar. 4, 2008

(87) PCT Pub. No.: WO2006/085642

PCT Pub. Date: Aug. 17, 2006

(65) Prior Publication Data

US 2009/0023874 A1    Jan. 22, 2009

(30) Foreign Application Priority Data

Feb. 8, 2005 (JP) ............................ 2005-032200
Feb. 8, 2005 (JP) ............................ 2005-032304
Feb. 8, 2005 (JP) ............................ 2005-032360

(51) Int. Cl.
- C08F 4/80 (2006.01)
- C08G 61/08 (2006.01)
- C08F 2/44 (2006.01)

(52) U.S. Cl. .................. 526/77; 526/171; 526/308; 526/309; 524/851; 524/852; 524/853; 524/855; 524/856

(58) Field of Classification Search ............... 526/77, 526/135, 171, 308, 309; 524/851, 852, 853, 524/855, 856
See application file for complete search history.

(56) References Cited

U.S. PATENT DOCUMENTS

| | | | |
|---|---|---|---|
| 4,069,376 A | 1/1978 | Minchak | |
| 4,110,528 A | 8/1978 | Minchak | |
| 4,748,216 A * | 5/1988 | Tom | 526/77 |
| 6,476,167 B2 * | 11/2002 | Peters | 526/209 |
| 7,285,598 B2 | 10/2007 | Arimoto et al. | |
| 2003/0144437 A1 | 7/2003 | Bell et al. | |
| 2006/0149009 A1 | 7/2006 | Arimoto et al. | |
| 2006/0211834 A1 | 9/2006 | Sugawara | |
| 2007/0021556 A1 | 1/2007 | Arimoto et al. | |
| 2007/0093599 A1 | 4/2007 | Arimoto et al. | |

FOREIGN PATENT DOCUMENTS

| | | |
|---|---|---|
| CA | 2246789 | 4/1999 |
| EP | 2000-309628 | 11/2000 |
| EP | 1 589 055 A1 | 10/2005 |
| JP | 5-132545 | 5/1993 |
| JP | 2000-72857 | 3/2000 |
| JP | 2001-139668 | 5/2001 |
| JP | 2003-335845 | 11/2003 |
| JP | 2004-035615 | 2/2004 |
| JP | 2004 35615 | 2/2004 |
| JP | 2004-155981 | 6/2004 |
| JP | 2004 155981 | 6/2004 |
| JP | 2005 97423 | 4/2005 |
| JP | 2005-097423 | 4/2005 |
| WO | WO 97/06185 | 2/1997 |
| WO | WO 97/20865 | 6/1997 |
| WO | WO 99/50331 | 10/1999 |
| WO | WO 00/18579 | 4/2000 |
| WO | WO 00/46256 A1 | 8/2000 |
| WO | WO 00/71554 A2 | 11/2000 |
| WO | WO 2004/069895 A1 | 8/2004 |
| WO | 2006/129378 A1 | 12/2006 |
| WO | 2006/129379 A1 | 12/2006 |

OTHER PUBLICATIONS

Database CA Online, Chemical Abstract, JP 2003-335845, Nov. 28, 2003, XP002493644, Database accession No. 2003:929605, 2 Pages.
F. H. Mark, et al., Encyclopedia of Polymer Science and Engineering $2^{nd}$ Edition, vol. 9, 1985, pp. 634-668.
U.S. Appl. No. 12/442,305, filed Mar. 20, 2009, Iwasaki, et al.

* cited by examiner

Primary Examiner—Fred M Teskin
(74) Attorney, Agent, or Firm—Oblon, Spivak, McClelland, Maier & Neustadt, L.L.P.

(57) ABSTRACT

A process of producing a ring-opening metathesis polymer characterized in that a treatment to decrease the amount of oxygen and/or peroxide in at least one kind of polymerization starting material is performed prior to the ring-opening metathesis polymerization reaction of a cyclic olefin performed in the presence of a ruthenium carbene complex (catalyst). Treatments to decrease the amount of oxygen and/or peroxide include applying an adsorbent to a polymerization starting material to remove oxygen and/or peroxide by adsorption, applying an antioxidant to a polymerization starting material to decompose oxygen or peroxide, and the like.

19 Claims, No Drawings

PROCESS FOR PRODUCING RING-OPENING METATHESIS POLYMER

TECHNICAL FIELD

The present invention relates to a process for producing a ring-opening metathesis polymer useful for applications such as various packaging materials, engineering plastics and the like.

BACKGROUND ART

Conventionally, redistribution of an ethylenic double bond (metathesis reaction) using a carbene complex represented by the following formula 4:

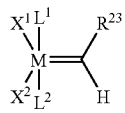

(4)

wherein M is selected from the group consisting of Os and Ru, $X^1$ and $X^2$ are each independently selected from anionic ligands, $L^1$ and $L^2$ are each independently selected from neutral electron donors, and $R^{23}$ is selected from a hydrogen atom, a substituted or unsubstituted alkyl group and a substituted or unsubstituted aryl group, is widely known (e.g., JP-A-11-510807). While a ruthenium carbene complex of the following formula 5:

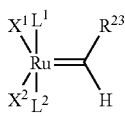

(5)

wherein $X^1$, $X^2$, $L^1$, $L^2$ and $R^{23}$ are as defined above, which is a complex of the formula 4 wherein M is Ru (ruthenium), is generally said to be stable, it is associated with a problem in that it is deactivated with oxygen or peroxide. The present inventors studied various aspects of a ring-opening metathesis polymerization reaction of a cyclic olefin using a ruthenium carbene complex as a catalyst, and found that the deactivation of the ruthenium carbene complex with oxygen or peroxide decreased the efficiency of the polymerization reaction.

In view of the above-mentioned situation, the problem to be solved by the invention is to provide a ring-opening metathesis polymer of a cyclic olefin with higher catalyst efficiency by the use of a ruthenium carbene complex as a catalyst.

DISCLOSURE OF THE INVENTION

The present inventors have conducted intensive studies in an attempt to solve the aforementioned problems and found that a ring-opening metathesis polymer can be obtained with higher catalyst efficiency when, in a ring-opening metathesis polymerization reaction of a cyclic olefin using a ruthenium carbene complex as a catalyst, the polymerization reaction is performed under the conditions of a smaller amount of oxygen or peroxide, which resulted in the completion of the present invention.

Accordingly, the present invention relates to (1) a process of producing a ring-opening metathesis polymer, which comprises subjecting, in the presence of a ruthenium carbene complex, at least one kind of cyclic olefin selected from a cyclic monoolefin represented by the following formula (1):

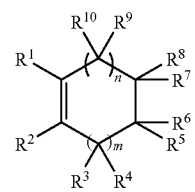

(1)

wherein $R^1$, $R^2$, $R^3$, $R^4$, $R^5$, $R^6$, $R^7$, $R^8$, $R^9$ and $R^{10}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, and m and n are each an integer of 0 to 4, wherein the total number of m and n is not less than 3, and a cyclic diolefin represented by the following formula (2):

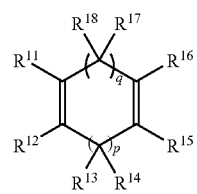

(2)

wherein $R^{11}$, $R^{12}$, $R^{13}$, $R^{14}$, $R^{15}$, $R^{16}$, $R^{17}$ and $R^{18}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, and p and q are each an integer of 0 to 4, wherein the total number of p and q is not less than 3, to a ring-opening metathesis polymerization reaction, wherein a treatment to decrease the amount of oxygen and/or peroxide in at least one kind of polymerization starting material is performed before the ring-opening metathesis polymerization reaction, (2) the process of the above-mentioned (1), wherein the treatment to decrease the amount of oxygen and/or peroxide in the polymerization starting material is performed using an antioxidant, (3) the process of the above-mentioned (2), wherein the antioxidant is a tertiary phosphine, (4) the process of any one of the above-mentioned (1) to (3), wherein the ruthenium carbene complex has a structure represented by the following formula (3):

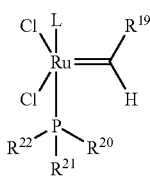

(3)

wherein $R^{19}$ is a hydrogen atom, an optionally substituted alkyl group, an optionally substituted alkenyl group, an optionally substituted cycloalkyl group or an optionally substituted aryl group, $R^{20}$, $R^{21}$ and $R^{22}$ are each a hydrogen atom, an optionally substituted alkyl group, an optionally substituted cycloalkyl group or an optionally substituted aryl group, and L is a neutral electron donor, (5) the process of any one of the above-mentioned (1) to (4), wherein the ruthenium carbene complex is used in the form of a dispersion in a nonsolvent medium, (6) the process of any one of the above-mentioned (1) to (5), wherein the dispersion of the ruthenium carbene complex in the nonsolvent medium is dissolved in a solvent medium, and immediately fed into the reaction system, (7) the process of the above-mentioned (6), wherein the solvent medium is tetrahydrofuran and/or toluene, (8) the process of any one of the above-mentioned (5) to (7), wherein the nonsolvent medium is a saturated hydrocarbon and/or an alcohol having 4 or more carbon atoms, (9) the process of any one of the above-mentioned (1) to (8), wherein the ring-opening metathesis polymerization reaction is performed in the presence of a ruthenium carbene complex and a chain transfer agent,

(10) the process of the above-mentioned (9), wherein the ratio (molar ratio) at one time point during the reaction of the total charge amount (mol) of the chain transfer agent to the total charge amount (mol) of the cyclic olefin is changed over time, and

(11) a ring-opening metathesis polymer produceable by the process of any one of the above-mentioned (1) to (10).

BEST MODE FOR EMBODYING THE INVENTION

The present invention is explained in more detail in the following.

The ruthenium carbene complex to be used in the present invention is not particularly limited and may be any as long as it shows a catalyst action in a ring-opening metathesis polymerization reaction. For example, a complex having a structure of the following formula 3:

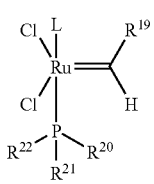

(3)

wherein $R^{19}$ is a hydrogen atom, an optionally substituted alkyl group, an optionally substituted alkenyl group, an optionally substituted cycloalkyl group or an optionally substituted aryl group, $R^{20}$, $R^{21}$ and $R^{22}$ are each a hydrogen atom, an optionally substituted alkyl group, an optionally substituted cycloalkyl group or an optionally substituted aryl group, and L is a neutral electron donor, can be mentioned.

Preferable examples of the "optionally substituted alkyl group" for $R^{19}$ of the formula 3 include an alkyl group having 1 to 20 carbon atoms (preferably 1 to 8 carbon atoms) such as methyl group, ethyl group, butyl group, octyl group and the like, a substituted alkyl group wherein the alkyl group is substituted by an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably having 1 to 8 carbon atoms) such as acetoxy group, propionyloxy group, hexanoyloxy group, benzoyloxy group and the like; and the like, and the like.

Preferable examples of the "optionally substituted alkenyl group" include an alkenyl group having 2 to 20 carbon atoms (preferably having 2 to 8 carbon atoms) such as ethenyl group, propenyl group, butenyl group, octenyl group and the like, a substituted alkenyl group wherein the alkenyl group is substituted by an alkyl group having 1 to 20 carbon atoms (preferably having 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably having 1 to 8 carbon atoms) such as methoxy group, ethoxy group, butoxy group and the like; a carbonyloxy group having 2 to 20 carbon atoms (preferably having 2 to 8 carbon atoms) such as acetoxy group, propionyloxy group, hexanoyloxy group, benzoyloxy group and the like; and the like, and the like.

Preferable examples of the "optionally substituted cycloalkyl group" include a cycloalkyl group such as cyclopentyl group, cyclohexyl group and the like, a substituted cycloalkyl group wherein the cycloalkyl group is substituted by an alkyl group having 1 to 20 carbon atoms (preferably having 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably having 1 to 8 carbon atoms) such as methoxy group, ethoxy group, butoxy group and the like; a carbonyloxy group having 2 to 20 carbon atoms (preferably having 2 to 8 carbon atoms) such as acetoxy group, propionyloxy group, hexanoyloxy group, benzoyloxy group and the like; and the like, and the like.

Preferable examples of the "optionally substituted aryl group" include an aryl group such as phenyl group, naphthyl group and the like, a substituted aryl group wherein the aryl group is substituted by an alkyl group having 1 to 20 carbon atoms (preferably having 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably having 1 to 8 carbon atoms) such as methoxy group, ethoxy group, butoxy group and the like; and the like, and the like.

In the "optionally substituted alkyl group", "optionally substituted alkenyl group", "optionally substituted cycloalkyl group" and "optionally substituted aryl group", the number of substituents is preferably 0-6, more preferably 0-3, which may be substituted at any substitutable position(s).

In the ruthenium carbene complex of the formula 3, $R^{19}$ is preferably an optionally substituted alkyl group, an optionally substituted alkenyl group or an optionally substituted aryl group.

In the formula 3, $R^{20}$, $R^{21}$ and $R^{22}$ may be the same or different, and preferable examples of the "optionally substituted alkyl group" for $R^{20}$, $R^{21}$ or $R^{22}$ include a linear alkyl group having 1 to 10 carbon atoms (preferably 1 to 8 carbon atoms) such as methyl group, ethyl group, butyl group, octyl group and the like; a branched alkyl group having 1 to 10 carbon atoms (preferably 1 to 8 carbon atoms) such as isopropyl group, isobutyl group and the like, a substituted alkyl group wherein the linear or branched alkyl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably 2 to 8 carbon atoms) such as acetoxy group, propionyloxy group, hexanoyloxy group, benzoyloxy group and the like; and the like, and the like.

Preferable examples of the "optionally substituted cycloalkyl group" include a cycloalkyl group such as cyclopentyl group, cyclohexyl group and the like, a substituted cycloalkyl group wherein the cycloalkyl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably 2 to 8 carbon atoms) such as acetoxy group, propionyloxy group, hexanoyloxy group, benzoyloxy group and the like; and the like, and the like.

Examples of the "optionally substituted aryl group" include an aryl group such as phenyl group, naphthyl group and the like, a substituted aryl group wherein the aryl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably 2 to 8 carbon atoms) such as acetoxy group, propionyloxy group, hexanoyloxy group, benzoyloxy group and the like; and the like, and the like.

In the "optionally substituted alkyl group", "optionally substituted cycloalkyl group" and "optionally substituted aryl group", the number of substituents is preferably 0-6, more preferably 0-3, which may be substituted at any substitutable position(s).

In the formula 3, L is a neutral electron donor and, for example, a phosphorus compound represented by the formula: $PR^{20}R^{21}R^{22}$ wherein $R^{20}$, $R^{21}$ and $R^{22}$ are as defined above, a nitrogen-containing carbene compound represented by the following formula 6:

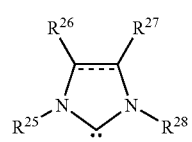

(6)

wherein $R^{25}$ and $R^{28}$ are each an optionally substituted alkyl group or an optionally substituted aryl group, $R^{26}$ and $R^{27}$ are each a hydrogen atom, an optionally substituted alkyl group or an optionally substituted aryl group, and ═══ shows a single bond or a double bond, and the like can be mentioned.

In the formula 6, $R^{25}$ and $R^{28}$ may be the same or different, and preferable examples of the "optionally substituted alkyl group" for $R^{25}$ or $R^{28}$ include an alkyl group having 1 to 20 carbon atoms (preferably 1 to 8 carbon atoms) such as methyl group, ethyl group, butyl group, octyl group and the like, a substituted alkyl group wherein the alkyl group is substituted by an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; a carbonyloxy group having 2 to 20 carbon atoms (preferably 2 to 8 carbon atoms) such as acetoxy group, propionyloxy group, hexanoyloxy group, benzoyloxy group and the like; and the like, and the like.

Preferable examples of the "optionally substituted aryl group" include an aryl group such as phenyl group, naphthyl group and the like, a substituted aryl group wherein the aryl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 5 carbon atoms such as methoxy group, ethoxy group, butoxy group and the like; and the like, and the like.

In the "optionally substituted alkyl group" and "optionally substituted aryl group", the number of substituents is preferably 0-6, more preferably 0-3, which may be substituted at any substitutable position(s).

In the ruthenium carbene complex of the formula 3, $R^{25}$ and $R^{28}$ in the formula 6 is each preferably phenyl group, 4-tolyl group, 2-tolyl group, 2,4-xylyl group, mesityl group, naphthyl group or anthranyl group.

In the formula 6, $R^{26}$ and $R^{27}$ may be the same or different, preferable examples of the "optionally substituted alkyl group" for $R^{26}$ or $R^{27}$ include an alkyl group having 1 to 20 carbon atoms (preferably 1 to 8 carbon atoms) such as methyl group, ethyl group, butyl group, octyl group and the like, a substituted alkyl group wherein the alkyl group is substituted by an aryl group such as phenyl group, tolyl group, xylyl group, mesityl group, naphthyl group and the like; a hydroxyl group; an alkoxy group having 1 to 20 carbon atoms (preferably 1 to 8 carbon atoms) such as methoxy group, ethoxy group, butoxy group and the like; carbonyloxy group having 2 to 20 carbon atoms (preferably 2 to 8 carbon atoms) such as acetoxy group, propionyloxy group, hexanoyloxy group, benzoyloxy group and the like; and the like, and the like.

Preferable examples of the "optionally substituted aryl group" include an aryl group such as phenyl group, naphthyl group and the like, a substituted aryl group wherein the aryl group is substituted by an alkyl group having 1 to 20 carbon atoms (preferably 1 to 8 carbon atoms) such as methyl group, ethyl group, butyl group, octyl group and the like; an aryl group such as phenyl group, tolyl group, xylyl group, mesityl group, naphthyl group and the like; a hydroxyl group; an alkoxy group having 1 to 5 carbon atoms such as methoxy group, ethoxy group, butoxy group and the like; and the like, and the like.

In the "optionally substituted alkyl group" and "optionally substituted aryl group", the number of substituents is preferably 0-6, more preferably 0-3, which may be substituted at any substitutable position(s).

In the ruthenium carbene complex of the formula 3, $R^{26}$ and $R^{27}$ in the formula 6 are each preferably a hydrogen atom or an alkyl group having 1 to 8 carbon atoms such as methyl group, ethyl group and the like.

The ruthenium carbene complex to be used in the present invention may be a commercially available product or may be prepared as necessary according to a known method.

The amount of the ruthenium carbene complex to be used in the present invention is not particularly limited and varies depending on the manner of reaction, structure of the object product and the like. From the aspects of the production rate and production efficiency, it is generally within the range of $1/1,000,000$ mol-$1/10$ mol, preferably $1/500,000$ mol-$1/100$ mol, per 1 mol of cyclic olefin to be used.

According to the present invention, the ring-opening metathesis polymerization reaction can proceed sufficiently even when an extremely small amount of the ruthenium carbene complex is used. Specifically, the ring-opening metathesis polymerization reaction can proceed sufficiently even when the amount of the ruthenium carbene complex is used in $1/10,000$ or below, or $5/100,000$ mol or below, per 1 mol of the cyclic olefin to be used.

The cyclic olefin to be used in the present invention includes a cyclic monoolefin of the following formula 1:

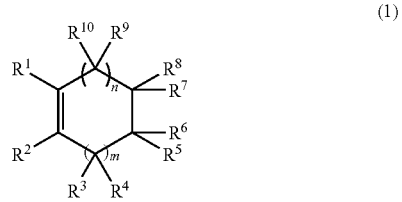

(1)

wherein $R^1, R^2, R^3, R^4, R^5, R^6, R^7, R^8, R^9$ and $R^{10}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, m and n are each an integer of 0-4 and the total number of m and n is not less than 3, and a cyclic diolefin of the following formula 2:

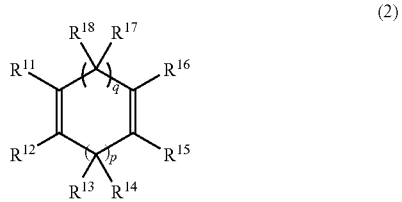

(2)

wherein $R^{11}, R^{12}, R^{13}, R^{14}, R^{15}, R^{16}, R^{17}$ and $R^{18}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, p and q are each an integer of 0-4 and the total number of p and q is not less than 3.

Preferable examples of the "halogen atom" for $R^1, R^2, R^3, R^4, R^5, R^6, R^7, R^8, R^9$ and $R^{10}$ in the above-mentioned formula 1 and $R^{11}, R^{12}, R^{13}, R^{14}, R^{15}, R^{16}, R^{17}$ and $R^{18}$ in the above-mentioned formula 2 include fluorine atom, chlorine atom, bromine atom and the like.

Preferable examples of the "optionally substituted alkyl group" include a linear or branched alkyl group having 1 to 20 carbon atoms (preferably having 1 to 8 carbon atoms) such as methyl group, ethyl group, n-propyl group, isopropyl group, n-butyl group, sec-butyl group, tert-butyl group, pentyl group, hexyl group, heptyl group, octyl group, nonyl group, decyl group, cetyl group, stearyl group and the like, a substituted alkyl group wherein the linear or branched alkyl group is substituted by a halogen atom such as fluorine atom, chlorine atom, bromine atom and the like; an alkoxy group such as methoxy group, ethoxy group, propoxy group, isopropoxy group, butoxy group and the like; a nitro group; a carboxyl group; an alkoxycarbonyl group such as methoxycarbonyl group, ethoxycarbonyl group and the like; an alkylcarbonyloxy group such as acetyloxy group, propionyloxy group and the like; and the like, and the like.

Preferable examples of the "optionally substituted cycloalkyl group" include a cycloalkyl group such as cyclobutyl group, cyclopentyl group, cyclohexyl group, cyclooctyl group and the like, a substituted cycloalkyl group wherein the cycloalkyl group is substituted by a halogen atom such as fluorine atom, chlorine atom, bromine atom and the like; an alkoxy group such as methoxy group, ethoxy group, propoxy group, isopropoxy group, butoxy group and the like; a nitro group; a carboxyl group; an alkoxycarbonyl group such as methoxycarbonyl group, ethoxycarbonyl group and the like; an alkylcarbonyloxy group such as acetyloxy group, propionyloxy group and the like; and the like, and the like.

Preferable examples of the "optionally substituted aryl group" include an aryl group such as phenyl group, naphthyl group and the like, a substituted aryl group wherein the aryl group is substituted by a halogen atom such as fluorine atom, chlorine atom, bromine atom and the like; an alkoxy group such as methoxy group, ethoxy group, propoxy group, isopropoxy group, butoxy group and the like; a nitro group; a carboxyl group; an alkoxycarbonyl group such as methoxycarbonyl group, ethoxycarbonyl group and the like; an acyl group such as acetyl group, propionyl group, benzoyl group and the like; an alkylcarbonyloxy group such as acetyloxy group, propionyloxy group and the like; and the like, and the like.

In the "optionally substituted alkyl group", "optionally substituted cycloalkyl group" and "optionally substituted aryl group", the number of substituents is preferably 0-6, more preferably 0-3, which may be substituted at any substitutable position(s).

For $R^1, R^2, R^3, R^4, R^5, R^6, R^7, R^8, R^9$ and $R^{10}$ in the above-mentioned formula 1 and $R^{11}, R^{12}, R^{13}, R^{14}, R^{15}, R^{16}, R^{17}$ and $R^{18}$ in the above-mentioned formula 2, preferable examples of the "alkoxy group" include methoxy group, ethoxy group, propoxy group, isopropoxy group, butoxy group and the like; preferable examples of the "ester group" include a carbonyloxy group having 2 to 20 carbon atoms such as acetyloxy group, propionyloxy group, benzoyloxy group and the like; and preferable examples of the "carboxyl group or a salt thereof" include alkali metal salt such as sodium salt, potassium salt and the like.

$R^1, R^2, R^3, R^4, R^5, R^6, R^7, R^8, R^9$ and $R^{10}$ in the above-mentioned formula 1 may be the same or different and $R^{11}, R^{12}, R^{13}, R^{14}, R^{15}, R^{16}, R^{17}$ and $R^{18}$ in the above-mentioned formula 2 may be the same or different. In $R^1, R^2, R^3, R^4, R^5, R^6, R^7, R^8, R^9$ and $R^{10}$ in the above-mentioned formula 1 and $R^{11}$, $R^{12}$, $R^{13}$, $R^{14}$, $R^{15}$, $R^{16}$, $R^{17}$ and $R^{18}$ in the above-mentioned formula 2, any plural members thereof optionally form a cyclic structure together with carbon atoms bonded thereto. Examples thereof include a cyclic ether such as epoxy group and the like formed by two hydroxyl groups condensed with each other.

When m and n in the above-mentioned formula 1 are each an integer of 2-4, $R^3$ and $R^4$, and $R^9$ and $R^{10}$, each in plurality, may be the same or different (preferably same), and the total number of m and n is preferable 4-8. When p and q in the above-mentioned formula 2 are each an integer of 2-4, $R^{13}$ and $R^{14}$, and $R^{17}$ and $R^{18}$, each in plurality, may be the same or different (preferably same), and the total number of p and q is preferable 4-8.

Specific examples of the cyclic monoolefin represented by the formula 1 (hereinafter to be also referred to as "cyclic monoolefin (1)") include cycloolefins such as cycloheptene, cyclooctene, cyclododecene, 1,5-dimethyl-1-cyclooctene and the like; cycloolefins having a hydroxyl group such as 1,2-dihydroxy-5-cyclooctene, 1,4-dihydroxy-2-cyclooctene, 1-hydroxy-4-cycloheptene and the like; halogen-containing cycloolefins such as 1-chloro-5-cyclooctene and the like; ether group-containing cycloolefins such as 1,2-dimethoxy-5-cyclooctene, 1,4-dimethoxy-2-cyclooctene, 1-methoxy-4-cycloheptene and the like; and ester group-containing cycloolefins such as 1,2-diacetoxy-5-cyclooctene, 1,4-diacetoxy-2-cyclooctene, 1-acetoxy-4-cycloheptene and the like.

Specific examples of the cyclic diolefin represented by the formula 2 (hereinafter to be also referred to as "cyclic diolefin (2)") include cyclic nonconjugated olefins such as 1,5-cyclooctadiene, 1,5-dimethyl-1,5-cyclooctadiene, dicyclopentadiene, 2,5-norbornadiene and the like, and the like.

In the present invention, cyclic monoolefin (1) and cyclic diolefin (2) each may be used alone or in a mixture of two or more kinds thereof.

In the present invention, a ring-opening metathesis polymerization can be performed using cyclic monoolefin (1) and/or cyclic diolefin (2) as a starting material. Unless otherwise specified in the present specification, the "cyclic olefin" refers to either the "cyclic monoolefin (1)", "cyclic diolefin (2)" or "both cyclic monoolefin (1) and cyclic diolefin (2)".

The process of producing the ring-opening metathesis polymer of the present invention is characterized in that a treatment to decrease the amount of oxygen and/or peroxide in the polymerization starting material is performed prior to the ring-opening metathesis polymerization reaction. As used herein, the "polymerization starting material" refers to various materials used for a ring-opening metathesis polymerization reaction and present in the reaction system, such as the above-mentioned ruthenium carbene complex (catalyst) and cyclic olefin (monomer), as well as the following solvents, chain transfer agents and the like. In the present invention, the "treatment to decrease the amount of oxygen and/or peroxide in the polymerization starting material" can be performed on at least one kind of material (polymerization starting material). That is, any one kind of various materials or two or more kinds of plural materials used as the polymerization starting materials may be subjected to the treatment. When plural materials are to be treated, each material may be independently treated or a mixture of plural materials may be treated.

While a method for a treatment to decrease the amount of oxygen and/or peroxide is not particularly limited, for example, a method comprising applying an adsorbent such as alumina, silica gel, activated carbon and the like to a polymerization starting material to remove oxygen and/or peroxide by adsorption, a method comprising applying an antioxidant such as transition metal compound (e.g., cobalt and the like), hindered phenols, phosphines, phosphites and the like to a polymerization starting material to decompose oxygen or peroxide and the like can be mentioned. As a treatment method for applying an adsorbent or an antioxidant to a polymerization starting material, in the case of an adsorbent, for example, a removal method by adsorption comprising passing a polymerization starting material through a column filled with an adsorbent, a method comprising adding an adsorbent to a polymerization starting material, stirring the mixture for a predetermined time, and removing the adsorbent by filtration and the like can be mentioned. In the case of an antioxidant, a method comprising introducing an antioxidant into a polymerization starting material (namely, introducing (adding) an antioxidant into a polymerization starting material, and stirring the mixture for a predetermined time) and the like can be mentioned.

A treatment with an antioxidant can decrease the amount of oxygen and/or peroxide in a polymerization starting material by merely introducing an antioxidant into a polymerization starting material, as mentioned above, and the treatment method is convenient. In addition, the method is preferable since it is superior in the effect of decreasing the amount of oxygen and/or peroxide, where the use of hindered phenols, phosphines, phosphites and the like from the antioxidants is preferable.

Examples of the above-mentioned hindered phenols include 2,6-di-t-butylphenol, 2,6-di-t-4-methylphenol, 2,6-di-t-butyl-4-methoxyphenol, 2,4,6-tri-t-butylphenol and the like. Examples of the phosphines include tertiary phosphine and the like. Examples of the phosphites include trimethylphosphite, triethylphosphite, tributylphosphite, trioctylphosphite, triphenylphosphite and the like. Of these, use of tertiary phosphine is preferable because the effect of decreasing the amount of oxygen and/or peroxide is high, an influence on the reaction using ruthenium is small and it is easily available.

Examples of the tertiary phosphine include a trialkylphosphine such as trimethylphosphine, triethylphosphine, tripropylphosphine, tributylphosphine, trihexylphosphine, trioctylphosphine and the like; a tricycloalkylphosphine such as tricyclohexylphosphine and the like; a triarylphosphine such as triphenylphosphine, tritolylphosphine, trinaphthylphosphine and the like; and the like. These may be used alone or in a combination of plural kinds thereof. Of these tertiary phosphines, triphenylphosphine is preferably used in consideration of the operability and easiness of detection of the phosphine and phosphine oxide corresponding thereto.

While the amount of antioxidant to be used is not particularly limited, it is generally selected from the range of 0.001- to 1000-fold by mol, preferably 0.01- to 100-fold by mol, more preferably 1- to 100-fold by mol, particularly preferably 1- to 50-fold by mol, relative to the number of moles of the ruthenium carbene complex to be used. When the amount of the antioxidant to be used is lower than 0.001-fold by mol, the effect of decreasing the amount of oxygen and/or peroxide tends to be small, and when it exceeds 1000-fold by mol, the effect of decreasing the amount of oxygen and/or peroxide comparable to the increased amount of the antioxidant used tends to be difficult to achieve. The method for introducing an antioxidant into a polymerization starting material may be a method comprising introducing (adding) the antioxidant to be used all at once, or a method comprising introducing (adding) the antioxidant in several portions, or a method comprising introducing (adding) the antioxidant continuously.

When a treatment to decrease the amount of oxygen and/or peroxide in a polymerization starting material is performed using an adsorbent, the amount of the adsorbent to be used is preferably about 0.1- to 10-fold weight relative to the weight of the polymerization starting material to be used.

As used in the present invention, for example, the "oxygen and/or peroxide" means one or multiple kinds selected from oxygen molecules including active oxygen such as triplet oxygen, singlet oxygen, superoxide anion, hydroxyl radical, hydrogen peroxide and the like; organic hydroperoxide; organic peracid; organic peracid ester and the like.

In the present invention, when an antioxidant is used, the "decrease in the amount of oxygen and/or peroxide" in a treatment step to decrease the amount of oxygen and/or peroxide in a polymerization starting material can be observed over time, for example, by measuring the amount of decomposition product of oxygen and/or peroxide or byproduct from the decomposition of oxygen and/or peroxide, which is present in the liquid after the treatment to decrease the amount of oxygen and/or peroxide. More specifically, referring to the use of tertiary phosphine as an antioxidant for example, the decrease can be confirmed over time as a decreased amount of oxygen and/or peroxide, by measuring at plural time points the amount of tertiary phosphine oxide produced in the polymerization starting material in the treatment step to decrease the amount of oxygen and/or peroxide. The method of measuring the amount of the decomposition product of oxygen or peroxide and the byproduct resulting from the decomposition of oxygen or peroxide can be appropriately selected depending on the kind of the decomposition product and byproduct. For example, methods such as high performance liquid chromatography (HPLC), gas chromatography (GC), ion chromatography, iodometric titration technique and the like; methods utilizing color development reaction of peroxide detection paper and the like; and the like can be mentioned. When tertiary phosphine is used as the above-mentioned antioxidant, tertiary phosphine oxide is preferably quantified by HPLC.

On the other hand, when an adsorbent is used to perform a treatment to decrease the amount of oxygen and/or peroxide in a polymerization starting material, a "decrease in the amount of oxygen and/or peroxide" can be observed over time by, for example, sampling the treated liquid at plural time points during the treatment step to decrease the amount of oxygen and/or peroxide, adding an excess amount of an antioxidant to the sample, stirring the mixture for a given time, measuring the amount of the newly resulting decomposition product of oxygen and/or peroxide or byproduct from the decomposition of oxygen and/or peroxide, determining therefrom the amount of oxygen and/or peroxide remaining in the treated liquid at each sampling time, and comparing the obtained values.

When the treatment to decrease the amount of oxygen and/or peroxide is performed by either method, the "decrease in the amount of oxygen and/or peroxide" can be confirmed over time by directly measuring the residual amount of oxygen and/or peroxide in the treated liquid by the iodometric titration method, a method utilizing color development reaction by peroxide detection paper and the like.

While the amount of decrease in oxygen and/or peroxide in a polymerization starting material is not particularly limited in the present invention, a smaller residual amount of oxygen and/or peroxide is more preferable. When the residual amount of oxygen and/or peroxide is high, an adverse influence on the ring-opening metathesis polymerization reaction is feared, such as oxidation of the ligand of ruthenium carbene complex by oxygen and/or peroxide to degrade the catalyst activity thereof and the like. Particularly, when the ruthenium carbene complex to be used 'such as one represented by the above-mentioned formula 3' contains a phosphine compound as a ligand, the phosphine compound is oxidized to phosphine oxide by oxygen and/or peroxide, and the catalyst activity of the ruthenium carbene complex is rapidly degraded in some cases.

A specific amount of decreased oxygen and/or peroxide is an amount such that the number of moles of tertiary phosphine oxide newly produced by stirring a polymerization starting material, which is after a decreasing treatment of oxygen and/or peroxide, at 55° C. for 1 hr in the presence of a tertiary phosphine (number of moles of oxygen and/or peroxide remaining after the decreasing treatment) is preferably not more than 100 mol %, more preferably not more than 30 mol %, further preferably not more than 5 mol %, relative to the number of moles of oxygen and/or peroxide, which has been decreased by the decreasing treatment of oxygen and/or peroxide (number of moles of tertiary phosphine oxide produced during the decreasing treatment of oxygen and/or peroxide when the treatment has been performed using the tertiary phosphine).

In the process of producing the ring-opening metathesis polymer of the present invention, a solvent may be used as necessary. While the solvent is not particularly limited, examples thereof include a saturated aliphatic hydrocarbon such as propane, butane, pentane, hexane, heptane, n-octane, 3-methylheptane, nonane, decane, dodecane, liquid paraffin and the like; an alicyclic hydrocarbon such as cyclohexane, cyclooctane and the like; an aromatic hydrocarbon such as benzene, toluene, xylene, mesitylene and the like; an alcohol such as methanol, ethanol, propanol, butanol, amyl alcohol, hexanol, cyclohexanol, n-octanol, 2-ethylhexanol, 2-methoxyethanol, glycerol and the like; an ether such as dimethyl ether, diethyl ether, diisopropyl ether, tetrahydrofuran, tetrahydropyran, 1,4-dioxane, dimethoxyethane and the like; an ester such as methyl acetate, ethyl acetate, butyl acetate, ethyl butyrate, butyl butyrate, methyl benzoate, ethyl benzoate and the like; a ketone such as acetone, 2-butanone, methylisopropylketone, methylisobutylketone and the like; an amide such as N,N-dimethylformamide, N,N-dimethylacetamide, N-methyl-2-pyrrolidone and the like; a sulfoxide such as dimethyl sulfoxide, sulfolane and the like; a halogen solvent such as dichloromethane, chloroform, carbon tetrachloride, dichloroethane and the like; and the like. The solvent may be used alone or in a combination of plural kinds thereof.

When a solvent is used, the amount of use thereof is not particularly limited. However, it is preferably within the range of 10-1,000,000 parts by weight, more preferably within the range of 100-100,000 parts by weight, still more preferably within the range of 1,000-10,000 parts by weight, per 1 part by weight of ruthenium carbene complex contained in the reaction system.

In the process of producing the ring-opening metathesis polymer of the present invention, a chain transfer agent represented by the following formula 7:

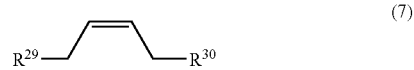

(7)

wherein $R^{29}$ and $R^{30}$ are the same or different and each is a hydrogen atom, an optionally substituted alkyl group, an optionally substituted cycloalkyl group, an optionally substituted aromatic hydrocarbon group, an optionally substituted alkoxy group, an optionally substituted aryloxy group, an optionally substituted alkoxycarbonyl group or a halogen atom, and the like may be used.

Preferable examples of the "optionally substituted alkyl group" for $R^{29}$ and $R^{30}$ in the formula 7 include a linear or branched alkyl group having 1 to 10 carbon atoms such as methyl group, ethyl group, n-propyl group, isopropyl group, n-butyl group, sec-butyl group, tert-butyl group, pentyl group, hexyl group, heptyl group, octyl group, nonyl group, decyl group and the like, and the like.

Preferable examples of the "optionally substituted cycloalkyl group" include a cycloalkyl group having 5 to 10 carbon atoms such as cyclopentyl group, cyclohexyl group, cyclooctyl group and the like, and the like.

Preferable examples of the "optionally substituted aromatic hydrocarbon group" include an aromatic hydrocarbon having 6 to 20 carbon atoms such as phenyl group, naphthyl group and the like, and the like.

Preferable examples of the "optionally substituted alkoxy group" include methoxy group, ethoxy group, propoxy group, isopropoxy group, butoxy group, methoxymethyl group and the like.

Preferable examples of the "optionally substituted aryloxy group" include phenoxy group, naphthyloxy group and the like.

Preferable examples of the "optionally substituted alkoxycarbonyl group" include methoxycarbonyl group, ethoxycarbonyl group, propoxycarbonyl group, isopropoxycarbonyl group, butoxycarbonyl group and the like.

Preferable examples of the "halogen atom" include fluorine atom, chlorine atom, bromine atom and the like.

Examples of the substituents of the "optionally substituted alkyl group", "optionally substituted cycloalkyl group", "optionally substituted aromatic hydrocarbon group", "optionally substituted alkoxy group", "optionally substituted aryloxy group", and "optionally substituted alkoxycarbonyl group" here include a halogen atom such as fluorine atom, chlorine atom, bromine atom and the like; an alkoxy group such as methoxy group, ethoxy group, propoxy group, isopropoxy group, butoxy group and the like; a nitro group; a carboxyl group; an alkoxycarbonyl group such as methoxycarbonyl group, ethoxycarbonyl group and the like; an alkylcarbonyloxy group such as acetyloxy group, propionyloxy group and the like; and the like. The number of substituents is preferably 0-6, more preferably 0-3, which may be substituted at any substitutable position(s).

In the formula 7, $R^{29}$ and $R^{30}$ are each preferably an alkyl group having 1 to 10 carbon atoms such as methyl group, ethyl group, n-propyl group, isopropyl group, n-butyl group, sec-butyl group, tert-butyl group, pentyl group, hexyl group, heptyl group, octyl group, nonyl group, decyl group and the like.

When a chain transfer agent is used, the amount thereof to be used varies depending on the object molecular weight of the polymer. However, it is generally $1/1,000,000$ mol-$1/10$ mol, and preferably $1/200,000$ mol-$1/50$ mol in consideration of the economic aspect and reaction rate, per 1 mol of cyclic olefin.

Specific examples of the chain transfer agent include cis-2-butene, cis-3-hexene, cis-4-octene, cis-2-butene-1,4-diol, cis-2-butene-1,4-diacetate, cis-4-hexen-1-ol and the like.

The process of producing the ring-opening metathesis polymer of the present invention can be performed in the presence of an inert gas at normal pressure. The process may be performed under inert gas pressurization depending on the reaction conditions such as the kind of a chain transfer agent and a solvent to be used and the like. Here, the pressure of the "pressurization" is preferably about 0.1-1 MPa.

In the present invention, while the reaction temperature of the ring-opening metathesis polymerization reaction is not particularly limited, it is preferably within the range of 20° C. to 100° C., more preferably within the range of 30° C. to 80° C. When the reaction temperature is lower than this range, the reaction rate of the ring-opening metathesis polymerization reaction becomes slow, and the catalyst is sometimes decomposed during the reaction, which markedly degrades the catalyst efficiency. When the reaction temperature is higher than this range, re-metathesis of the polymer sometimes occurs, which markedly increases the molecular weight.

Specific examples of the process of producing the ring-opening metathesis polymer of the present invention include a method comprising charging the above-mentioned cyclic olefin in a reaction vessel under an inert gas atmosphere, adding the above-mentioned solvent, chain transfer agent and the like as necessary, adding the above-mentioned antioxidant and stirring the mixture, and adding a ruthenium carbene complex at the time point when production of a tertiary phosphine oxide is not substantially observed, whereby the ring-opening metathesis polymerization reaction is initiated.

Stirring the mixture with heating after the addition of an antioxidant is preferable because peroxide can be efficiently decomposed and deactivation of the ruthenium carbene complex by oxygen and/or peroxide can be minimized. The heating temperature at the time of stirring is preferably about 40° C. to 80° C. Too high a heating temperature may cause problems, for example, such as isomerization of cyclic olefin when it is used as a starting material and the like. Too low a heating temperature is not preferable because the effect of decreasing the amount of peroxide by an antioxidant is sometimes degraded markedly. Furthermore, when a sufficient amount of unreacted antioxidant is not present before addition of a ruthenium carbene complex, an antioxidant is preferably added anew.

The process of producing the ring-opening metathesis polymer of the present invention may be performed according to a batch method or a continuous method.

In the present invention, the method of introducing a ruthenium carbene complex (catalyst) into the reaction system of a ring-opening metathesis polymerization reaction is not particularly limited. A ruthenium carbene complex may be directly introduced into the reaction system (reaction vessel). Alternatively, a ruthenium carbene complex is added to a solvent to be used for the ring-opening metathesis polymerization reaction, other solvents, a cyclic olefin which is a reaction substrate, a chain transfer agent, or a mixture thereof, and the mixture may be introduced into the reaction system (reaction vessel). In the latter case, since ruthenium carbene complex (catalyst) is sometimes deactivated depending on the kind of the solvent, cyclic olefin and chain transfer agent, the method of addition and conditions of the ruthenium carbene complex and the like, it is preferable to immediately introduce the ruthenium carbene complex into the reaction system after addition of the complex to them. Here, by the "immediately" is meant within 30 min (preferably within 10 min) after the addition of the ruthenium carbene complex (catalyst) to a solvent, a cyclic olefin, a chain transfer agent or a mixture thereof.

In the present invention, a ruthenium carbene complex is preferably dispersed in a nonsolvent medium. By dispersing the ruthenium carbene complex in a nonsolvent medium, the complex can be preserved stably and used without degrading the activity of the complex as a catalyst. Examples of the nonsolvent medium include saturated hydrocarbons such as pentane, cyclopentane, hexane, cyclohexane, heptane, octane, cyclooctane, nonane, decane, dodecane, liquid paraffin and the like, and alcohols such as methanol, ethanol, propanol, butanol, amyl alcohol, hexanol, cyclohexanol, octanol and the like. When a medium having a high affinity for water is used, water that often influences the reaction in an adverse manner is easily introduced into the system. Thus, a saturated hydrocarbon and/or an alcohol having 4 or more carbon atoms are/is preferably used.

While the preservation state of a dispersion wherein a ruthenium carbene complex is dispersed in a nonsolvent medium (hereinafter to be simply referred to as a dispersion) is not particularly limited, it is preferable to maintain uniform dispersion by a method such as gentle stirring with a stirrer, circulation with a pump, and the like because the ruthenium carbene complex may precipitate or float when the specific gravity differs strikingly between the ruthenium carbene complex and the nonsolvent medium.

While the dispersion concentration of the dispersion is not particularly limited, a ruthenium carbene complex is preferably dispersed in a nonsolvent medium generally within the range of 0.01 part by weight-200 parts by weight, more preferably within the range of 0.1 part by weight-100 parts by weight, per 100 parts by weight of the nonsolvent medium, in consideration of the operability when in use, susceptibility to the effect of oxygen incorporation and the like.

An antioxidant may be added to the nonsolvent medium. Examples of the antioxidant include phenols having large steric hindrance (e.g., hindered phenols), phosphines, phosphites and the like. In consideration of the reaction rate of the ring-opening metathesis polymerization, phosphines are preferably used. Here, the "antioxidant", "hindered phenols", "phosphines" and "phosphites" are as defined above, and specific examples thereof are those exemplified above. While the amount of the antioxidant to be used is not particularly limited, it is generally within the range of 0.001-fold by mol to 1000-fold by mol, and in consideration of the operability, economic aspect and the effect of the antioxidant, preferably 0.01-fold by mol to 100-fold by mol, relative to the ruthenium carbene complex.

While the preservation temperature of the dispersion is not particularly limited, it is generally within the range of −10° C. to 80° C., more preferably 0° C. to 60° C., since too low a temperature cannot maintain the flowability, which degrades operability when in use, and too high a temperature sometimes degrades the stability of the ruthenium carbene complex if it should contact oxygen and the like.

The process of producing the ring-opening metathesis polymer of the present invention can be performed by subjecting the ruthenium carbene complex to the reaction in the form of a dispersion in the aforementioned nonsolvent medium. As used herein, the "subjecting" includes feeding a dispersion of the above-mentioned ruthenium carbene complex in a nonsolvent medium into, for example, a reaction system containing the aforementioned cyclic olefin and the like, feeding the aforementioned cyclic olefin, a chain transfer agent and a solvent medium into a dispersion of the ruthenium carbene complex in a nonsolvent medium, or feeding a mixture of them. In the ring-opening metathesis polymerization reaction, the ruthenium carbene complex may be dissolved or dispersed in the reaction system. It is also possible to perform the ring-opening metathesis polymerization reaction by dissolving, in a solvent medium, a dispersion of the ruthenium carbene complex in the aforementioned nonsolvent medium, and immediately feeding the solution into the reaction system.

The above-mentioned solvent medium is not particularly limited as long as it can dissolve the ruthenium carbene complex to be used and, for example, an aromatic hydrocarbon such as benzene, toluene, xylene, mesitylene and the like; an ether such as dimethyl ether, diethyl ether, diisopropyl ether, tetrahydrofuran, tetrahydropyran, dioxane, dimethoxyethane and the like; an ester such as methyl acetate, ethyl acetate, butyl acetate, ethyl butyrate, butyl butyrate, methyl benzoate, ethyl benzoate and the like; and a halogenated solvent such as dichloromethane, chloroform, carbon tetrachloride, dichloroethane and the like can be used. The solvent medium may be used alone or in a combination of plural kinds thereof.

When the above-mentioned dispersion is dissolved in a solvent medium and fed into the reaction system in the process of producing the ring-opening metathesis polymer of the present invention, the dispersion is preferably dissolved in a solvent medium and immediately fed into the reaction system. After feeding into the reaction system, the ring-opening metathesis polymerization reaction is preferably started immediately. This is because the catalyst activity of ruthenium carbene complex tends to decrease rapidly when it is dissolved in a solvent medium in the absence of a compound to be the substrate for the ring-opening metathesis polymerization reaction, such as the above-mentioned cyclic olefin and the like. The time from the dissolution of the above-mentioned dispersion in a solvent medium up to its feeding into the reaction system is preferably within the range of 0.001-10 min, more preferably within the range of 0.01-5 min.

When such method comprising feeding the above-mentioned dispersion into the reaction system after dissolution in a solvent medium is employed, the rate of dissolution of respective ruthenium carbene complex particles in the dispersion can be easily decreased, which in turn facilitates production of a ring-opening metathesis polymer having a small molecular weight distribution.

The amount of the solvent medium to be used for dissolving the above-mentioned dispersion in a solvent medium is not particularly limited. It is preferably within the range of 10-1,000,000 parts by weight, more preferably within the range of 100-100,000 parts by weight, still more preferably within the range of 1,000-10,000 parts by weight, per 1 part by weight of the ruthenium carbene complex contained in the dispersion.

Specific examples of the method of the present invention using such dispersion include a method according to the batch method comprising feeding the dispersion in advance into the reaction vessel, then feeding a starting material, a solvent and the like to allow reaction, a method using what is called a continuous system comprising feeding, by a piston flow method, the dispersion alone or the dispersion and the starting material etc. under mixing into the reaction system and the like.

However, when the above-mentioned solvent medium is used as the solvent of a ring-opening metathesis polymerization reaction and such solvent is fed in advance into a reaction vessel and then the aforementioned dispersion, or the dispersion dissolved in an solvent medium is fed thereinto even when a compound (e.g., cyclic olefin and the like) to be the substrate for the ring-opening metathesis polymerization reaction is absent, the ruthenium carbene complex is released from the protection with a nonsolvent medium and exposed to the influence of the solvent, thereby sometimes degrading the catalyst activity unpreferably due to the Ru—Ru coupling and the like.

In the present invention, when a chain transfer agent is used for the ring-opening metathesis polymerization, the ratio of the cyclic olefin to the chain transfer agent to be supplied into the reaction system is preferably changed over time during the reaction. The ratio is a proportion at one time point during the reaction of the total number of moles of cyclic olefin charged up to that time point and the total number of moles of the chain transfer agent charged up to that time point.

In general, a ring-opening metathesis polymerization reaction using a ruthenium carbene complex as a catalyst is characterized in that an olefin having a functional group can be used as a monomer. This reaction functions not only as a ring-opening reaction but also as a polymerization reaction because the ring distortion of the cyclic olefin is released by the catalyst to promote the polymerization reaction. As a result, the compound with more distortion rapidly approaches the catalyst to induce the next reaction. When a chain transfer agent free of a ring distortion is supplied into the reaction system at a constant ratio throughout the reaction, a desired reaction may not be carried out because the reaction rate of the chain transfer agent is slower than that of the cyclic olefin. In this case, the chain transfer agent is accumulated, and the molecular weight distribution of the obtained ring-opening metathesis polymer may be enlarged.

That is, when the ratio (molar ratio) of the cyclic olefin and chain transfer agent in the ring-opening metathesis polymerization reaction is constant, a high molecular weight polymer is produced in the early stage of reaction, and a low molecular weight polymer is produced in the later stage of reaction, thus enlarging the molecular weight distribution. Accordingly, the concentration of the chain transfer agent is preferably high in the early stage of reaction and low in the later stage of reaction. In other words, in a preferable embodiment of time-course changes of the ratio (molar ratio) of the total charge amount (mol) of the chain transfer agent and the total charge amount (mol) of the cyclic olefin at one time point during the reaction, the [total charge amount (mol) of chain transfer agent used up to that point/total charge amount (mol) of cyclic olefin used up to that point] at one time point during the reaction is greater than that at another later time point during the reaction.

The supply ratio of the cyclic olefin and chain transfer agent varies depending on the structure of the cyclic olefin to be used. For example, when the final molar ratio of the cyclic olefin and chain transfer agent is 100:1 in the reaction, a method wherein they are supplied at 30:1 at the start of the reaction and at 300:1 in the later stage of the reaction and the like may be employed. It is also possible to start the ring-opening metathesis polymerization, for example, by first supplying the entire amount of the chain transfer agent to be used and a part of the cyclic olefin to be used, and later supply the remaining cyclic olefin.

While it is preferable that the supply ratio of the cyclic olefin and chain transfer agent continuously changes, the starting material may be sequentially supplied at varying ratios to perform the reaction.

By adding a compound having terminal olefin, the catalyst can be deactivated easily to quench the ring-opening metathesis polymerization reaction. Examples of the usable terminal olefin compound include alkenes such as ethylene, propylene, butene, pentene and the like; styrenes such as styrene, α-methylstyrene and the like; vinyl ethers such as methyl vinyl ether, ethyl vinyl ether, propyl vinyl ether and the like. The amount of the terminal olefin compound to be used for quenching the reaction is not particularly limited. It is generally within the range of 1- to 1000-fold by mol and, in consideration of the economic aspect and reaction efficiency, within the range of 2- to 100-fold by mol, per 1 mol of the ruthenium carbene complex used.

The ring-opening metathesis polymer obtained by the process of producing the ring-opening metathesis polymer of the present invention can be isolated with ease, for example, by subjecting the reaction mixture after the ring-opening metathesis polymerization reaction to a method such as distillation, filtration, reprecipitation, column chromatography and the like.

In the above-mentioned reprecipitation, the ring-opening metathesis polymer can be generally obtained as a precipitate by cooling from the reaction temperature to room temperature. Where necessary, the polymer can be separated from the catalyst and recovered by a conventional method such as reprecipitation by feeding the reaction solution into a poor solvent such as saturated hydrocarbon (e.g., hexane, heptane and the like), water and the like. While the molecular weight of the ring-opening metathesis polymer is not limited, it is generally 1,000-500,000, preferably 2,000-300,000. While the molecular weight distribution is not limited, it is generally 1-12, preferably 1-10. The molecular weight distribution in the present invention means a ratio (Mw/Mn) of the weight average molecular weight (Mw) to the number average molecular weight (Mn).

The ring-opening metathesis polymer obtained by the present invention can be used in the form of various molded products such as film, sheet, container and the like according to a known molding method of polymer materials, for example, injection molding, blow molding, extrusion forming, inflation molding and the like. Such molded products can be used directly or after processing into various forms, such as various packaging materials for products (for food, drink, pharmaceutical product etc.) and the like. In addition, the ring-opening metathesis polymer obtained by the present invention can be used as a starting material of other polymers.

EXAMPLES

The present invention is explained in detail in the following by referring to Examples and Comparative Examples, which are not to be construed as limitative. In the following Examples, the amount of triphenylphosphine oxide was analyzed according to the following method.

<Analysis Conditions> apparatus: high performance liquid chromatography (HPLC)

column: ODS-3 (column temperature: 40° C.)

mobile phase: acetonitrile-water=3:1 (volume ratio) (flow rate: 1.0 mL/min)

detector: UV detector (wavelength: 254 nm)

The number average molecular weight (Mn) and the weight average molecular weight (Mw) of the ring-opening metathesis polymers obtained in the following Examples were analyzed according to the following method.

<Analysis Conditions> apparatus: gel permeation chromatography (GPC)

column: HFIP806M (Shodex) (column temperature: 40° C.)

mobile phase: hexafluoroisopropanol (HFIP)+20 mM $CF_3CO_2Na$ (flow rate: 1.0 mL/min)

Run: 18 min detector: RI filtration: 0.45 μm filter concentration: 0.05% injection volume: 200 μL standard: polymethylmethacrylate (PMMA)

analysis: Millennium 32

Example 1

Treatment With Antioxidant

After substituting a 50 mL three-neck glass flask equipped with a stirrer and a thermometer with dry nitrogen, THF (19.2 mL) containing 5-cyclooctene-1,2-diol (4.5 g, 32 mmol) and cis-4-octene (19.7 mg, 0.176 mmol) dissolved therein was charged. Then, triphenylphosphine (6.0 mg, 0.023 mmol) was added, and the mixture was stirred at 55° C. for 6 hr while analyzing by HPLC, until the production of triphenylphosphine oxide disappeared (until the new production of triphenylphosphine oxide was not observed after stirring the mixture at 55° C. for 1 hr). At this time point, the amount of the triphenylphosphine oxide produced was 0.011 mmol.

[1,3-Bis(2,4,6-trimethylphenyl)-2-imidazolidinylidene]dichloro(phenylmethylene)-(tricyclohexylphosphine)ruthenium (1.19 mg, 1.40 µmol) was dissolved in THF (1.0 mL), and the mixture was immediately added to the solution after the above-mentioned treatment with an antioxidant to allow a ring-opening metathesis polymerization (ROMP) at 55° C. After 1 hr, disappearance of 5-cyclooctene-1,2-diol was confirmed by analyzing with gas chromatography (GC-14B manufactured by Shimadzu Corporation; column: G-100 manufactured by Chemicals Inspection & Testing Institute, Japan). Thereafter, ethyl vinyl ether (30.3 mg, 0.420 mmol) was added, and the solvent was continuously evaporated under reduced pressure to give a polymer (4.4 g, yield 97%) having a number average molecular weight (Mn) of 58,000.

Comparative Example 1

After substituting a 50 mL three-neck glass flask equipped with a stirrer and a thermometer with dry nitrogen, THF (19.2 mL) containing 5-cyclooctene-1,2-diol (4.5 g, 32 mmol) and cis-4-octene (19.7 mg, 0.176 mmol) dissolved therein was charged. Then, a catalyst solution containing [1,3-bis(2,4,6-trimethylphenyl)-2-imidazolidinylidene]dichloro(phenylmethylene)-(tricyclohexylphosphine)ruthenium (1.19 mg, 1.40 µmol) dissolved in THF (1.0 mL) was immediately added to allow a ring-opening metathesis polymerization (ROMP) at 55° C. After 1 hr, the degree of conversion of 5-cyclooctene-1,2-diol was 13% by analyzing with gas chromatography (GC-14B manufactured by Shimadzu Corporation; column: G-100 manufactured by Chemicals Inspection & Testing Institute, Japan) and the reaction could not be completed.

Example 2

After substituting a 5000 mL three-neck glass flask equipped with a stirrer and a thermometer with dry nitrogen, 5-cyclooctene-1,2-diol (96 g, 680 mmol), cis-4-octene (1.97 g, 17.6 mmol) and THF (640mL) were charged. Then, triphenylphosphine (127.9 mg, 0.488 mmol) was added, and the mixture was stirred at 55° C. for 6 hr while analyzing by HPLC, until the production of triphenylphosphine oxide disappeared (until the new production of triphenylphosphine oxide was not observed after stirring the mixture at 55° C. for 1 hr). In the treatment, the final production amount of triphenylphosphine oxide was 0.112 mmol. The obtained solution is taken as preparation solution A.

After substituting a 2000 mL three-neck glass flask equipped with a stirrer and a thermometer with dry nitrogen, 5-cyclooctene-1,2-diol (192 g, 1350 mmol) and THF (1280 mL) were charged. Then, triphenylphosphine (266 mg, 1.01 mmol) was added, and the mixture was stirred at 55° C. for 6 hr while analyzing by HPLC, until the production of triphenylphosphine oxide disappeared (until the new production of triphenylphosphine oxide was not observed after stirring the mixture at 55° C. for 1 hr). In the treatment, the final production amount of triphenylphosphine oxide was 0.233 mmol. The obtained solution is taken as preparation solution B.

[1,3-Bis(2,4,6-trimethylphenyl)-2-imidazolidinylidene]dichloro(phenylmethylene)-(tricyclohexylphosphine)ruthenium (29.8 mg, 35 µmol) was dispersed in liquid paraffin (3 g), and the dispersion was left standing for 2 hr to give dispersion C. THF (20 mL) was added to dispersion C to allow dissolution. The solution was rapidly added to preparation solution A heated to 55° C. Then, preparation solution B was added to preparation solution A at a flow rate of 80 mL/min to allow ROMP reaction. After 1 hr, disappearance of 5-cyclooctene-1,2-diol was confirmed by analyzing with gas chromatography (GC-14B manufactured by Shimadzu Corporation; column: G-100 manufactured by Chemicals Inspection & Testing Institute, Japan). Thereafter, ethyl vinyl ether (3.02 g, 42 mmol) was added, and the mixture was further stirred for 30 min. The solvent was evaporated under reduced pressure to give a polymer (287.2 g, yield 99%) having a number average molecular weight (Mn) of 60,000 and a molecular weight distribution (Mw/Mn) of 5.5.

INDUSTRIAL APPLICABILITY

As is clear from the foregoing explanation, according to the present invention, a ring-opening metathesis polymer can be produced at a higher reaction rate by a ring-opening metathesis polymerization reaction of a cyclic olefin without degrading the high activity inherently possessed by the catalyst. Because of being free of a decrease in the concentration of the catalyst maintaining the high activity during reaction, the thus-obtained polymer shows a small difference between polymerization lots and becomes homogeneous, and a ring-opening metathesis polymer having a comparatively sharp molecular weight distribution can be produced.

This application is based on patent application Nos. 2005-032200, 2005-032304 and 2005-032360 filed in Japan, and the contents of which are incorporated in full herein by this reference.

The invention claimed is:

1. A process of producing a ring-opening metathesis polymer, which comprises subjecting, in the presence of a ruthenium carbene complex, at least one kind of cyclic olefin selected from a cyclic monoolefin represented by the following formula (1):

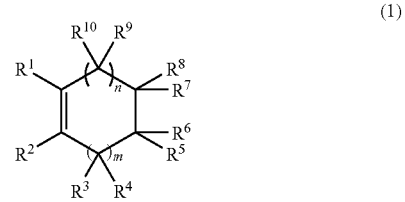

(1)

wherein $R^1$, $R^2$, $R^3$, $R^4$, $R^5$, $R^6$, $R^7$, $R^8$, $R^9$ and $R^{10}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, and m and n are each an integer of 0 to 4, wherein the total number of m and n is not less than 3, and a cyclic diolefin represented by the following formula (2):

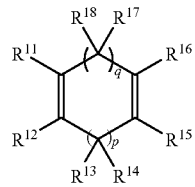

(2)

wherein $R^{11}$, $R^{12}$, $R^{13}$, $R^{14}$, $R^{15}$, $R^{16}$, $R^{17}$ and $R^{18}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, and p and q are each an integer of 0 to 4, wherein the total number of p and q is not less than 3, to a ring-opening metathesis polymerization reaction, wherein a treatment to decrease the amount of oxygen and/or peroxide in at least one kind of polymerization starting material which comprises the cyclic olefin is performed by adding an antioxidant and stirring at a temperature of 40 to 80° C. before the ring-opening metathesis polymerization reaction.

2. The process of claim 1, wherein the antioxidant is a tertiary phosphine.

3. The process of claim 1 or 2, wherein the ruthenium carbene complex has a structure represented by the following formula (3):

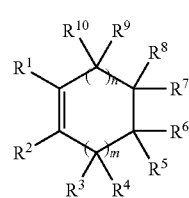

(3)

wherein $R^{19}$ is a hydrogen atom, an optionally substituted alkyl group, an optionally substituted alkenyl group, an optionally substituted cycloalkyl group or an optionally substituted aryl group, $R^{20}$, $R^{21}$ and $R^{22}$ are each a hydrogen atom, an optionally substituted alkyl group, an optionally substituted cycloalkyl group or an optionally substituted aryl group, and L is a neutral electron donor.

4. The process of claim 1 or 2, wherein the ruthenium carbene complex is used in the form of a dispersion in a nonsolvent medium.

5. The process of claim 1 or 2, wherein a dispersion of the ruthenium carbene complex in a nonsolvent medium is dissolved in a solvent medium, and the resulting solution is immediately fed into a reaction system comprising at least one kind of the cyclic olefin.

6. The process of claim 5, wherein the solvent medium is tetrahydrofuran and/or toluene.

7. The process of claim 4, wherein the nonsolvent medium is a saturated hydrocarbon and/or an alcohol having 4 or more carbon atoms.

8. The process of claim 1 or 2, wherein the ring-opening metathesis polymerization reaction is performed in the presence of a ruthenium carbene complex and a chain transfer agent.

9. The process of claim 8, wherein the ratio (molar ratio) at one time point during the reaction of the total charge amount (mol) of the chain transfer agent to the total charge amount (mol) of the cyclic olefin is changed over time.

10. The process of claim 1 or 2, wherein the polymerization starting material further comprises solvent and chain transfer agent.

11. The process of claim 1 or 2, wherein a number of moles of oxygen and/or peroxide remaining after the treatment is not more than 100 mol % relative to a number of moles of oxygen and/or peroxide which has been decreased by the treatment.

12. A process of producing a ring-opening metathesis polymer, which comprises subjecting, in the presence of a ruthenium carbene complex, at least one kind of cyclic olefin selected from a cyclic monoolefin represented by the following formula (1):

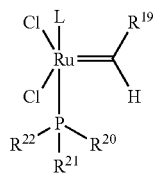

(1)

wherein $R^1$, $R^2$, $R^3$, $R^4$, $R^5$, $R^6$, $R^7$, $R^8$, $R^9$ and $R^{10}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, and m and n are each an integer of 0 to 4, wherein the total number of m and n is not less than 3, and a cyclic diolefin represented by the following formula (2):

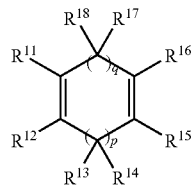

(2)

wherein $R^{11}$, $R^{12}$, $R^{13}$, $R^{14}$, $R^{15}$, $R^{16}$, $R^{17}$ and $R^{18}$ are each a hydrogen atom, a halogen atom, an optionally substituted alkyl group, an optionally substituted cycloalkyl group, an optionally substituted aryl group, a hydroxyl group, an alkoxy group, a carbonyl group, an ester group or a carboxyl group or a salt thereof, wherein any plural members thereof optionally form a cyclic structure together with carbon atoms bonded thereto, and p and q are each an integer of 0 to 4, wherein the total number of p and q is not less than 3, to a ring-opening metathesis polymerization reaction, wherein a treatment to decrease the amount of oxygen and/or peroxide in at least one kind of polymerization starting material is performed before the ring-opening metathesis polymerization reaction, and a dispersion of the ruthenium carbene complex in a nonsolvent medium is dissolved in a solvent medium and the resulting solution is immediately fed into a reaction system comprising at least one kind of the cyclic olefin.

13. The process of claim 12, wherein the treatment to decrease the amount of oxygen and/or peroxide in the polymerization starting material is performed using an antioxidant.

14. The process of claim 13, wherein the antioxidant is a tertiary phosphine.

15. The process of any one of claims 12 to 14, wherein the ruthenium carbene complex has a structure represented by the following formula (3):

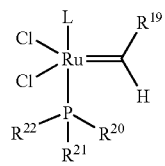

(3)

wherein $R^{19}$ is a hydrogen atom, an optionally substituted alkyl group, an optionally substituted alkenyl group, an optionally substituted cycloalkyl group or an optionally substituted aryl group, $R^{20}$, $R^{21}$ and $R^{22}$ are each a hydrogen atom, an optionally substituted alkyl group, an optionally substituted cycloalkyl group or an optionally substituted aryl group, and L is a neutral electron donor.

16. The process of any one of claims 12 to 14, wherein the solvent medium is tetrahydrofuran and/or toluene.

17. The process of any one of claims 12 to 14, wherein the nonsolvent medium is a saturated hydrocarbon and/or an alcohol having 4 or more carbon atoms.

18. The process of any one of claims 12 to 14, wherein the ring-opening metathesis polymerization reaction is performed in the presence of a ruthenium carbene complex and a chain transfer agent.

19. The process of claim 18, wherein the ratio (molar ratio) at one time point during the reaction of the total charge amount (mol) of the chain transfer agent to the total charge amount (mol) of the cyclic olefin is changed over time.

* * * * *